(12) United States Patent
Weyerhaeuser et al.

(10) Patent No.: US 9,229,978 B2
(45) Date of Patent: Jan. 5, 2016

(54) RULE-BASED EXTENDABLE QUERY OPTIMIZER

(71) Applicants: Christoph Weyerhaeuser, Heidelberg (DE); Tobias Mindnich, Sulzbach (DE); Daniel Baeumges, Viersen (DE); Gerrit Simon Kazmaier, Heidelberg (DE)

(72) Inventors: Christoph Weyerhaeuser, Heidelberg (DE); Tobias Mindnich, Sulzbach (DE); Daniel Baeumges, Viersen (DE); Gerrit Simon Kazmaier, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/337,023

(22) Filed: Jul. 21, 2014

(65) Prior Publication Data

US 2014/0330807 A1  Nov. 6, 2014

Related U.S. Application Data

(63) Continuation of application No. 13/457,330, filed on Apr. 26, 2012, now Pat. No. 8,793,243.

(51) Int. Cl.
   *G06F 17/30* (2006.01)

(52) U.S. Cl.
   CPC .... *G06F 17/30442* (2013.01); *G06F 17/30991* (2013.01)

(58) Field of Classification Search
   CPC .......... G06F 17/30457; G06F 17/3046; G06F 17/30463; G06F 17/30466
   USPC .................................................. 707/748, 717
   See application file for complete search history.

(56) References Cited

U.S. PATENT DOCUMENTS

| | | | |
|---|---|---|---|
| 5,873,075 A * | 2/1999 | Cochrane et al. ...................... 1/1 |
| 6,205,441 B1 * | 3/2001 | Al-omari et al. ...................... 1/1 |
| 2006/0161557 A1 * | 7/2006 | Dettinger et al. ............. 707/100 |
| 2006/0235837 A1 * | 10/2006 | Chong et al. ....................... 707/4 |
| 2007/0239673 A1 * | 10/2007 | Barsness et al. .................. 707/3 |
| 2010/0161576 A1 * | 6/2010 | Chen et al. ....................... 707/705 |
| 2010/0287185 A1 * | 11/2010 | Cras et al. ......................... 707/769 |
| 2011/0131200 A1 * | 6/2011 | Zhou et al. ....................... 707/714 |
| 2012/0089596 A1 * | 4/2012 | Siddiqui et al. ................ 707/718 |

* cited by examiner

*Primary Examiner* — Cam-Y Truong
(74) *Attorney, Agent, or Firm* — Mintz Levin Cohn Ferris Glovsky and Popeo P.C.

(57) ABSTRACT

A query is received which causes an initial data flow graph that includes a plurality of nodes that are used to execute the query is generated. Thereafter, the initial data flow graph is optimized using a model optimizer that includes an optimizer framework and an application programming interface (API). The optimizer framework provides logic to restructure the initial data flow graph and a rules engine for executing one or more optimization rules. The API allows for registration of new optimization rules to be executed by the rules engine. Execution of the query is then initiated using the optimized data flow graph. Related apparatus, systems, techniques and articles are also described.

14 Claims, 5 Drawing Sheets

RULE-BASED EXTENDABLE QUERY OPTIMIZER

CROSS REFERENCE TO RELATED APPLICATION

This is a continuation of U.S. application Ser. No. 13/457,330 filed Apr. 26, 2012 entitled RULE-BASED EXTENDABLE QUERY OPTIMIZER, the disclosure of which is incorporated herein by reference.

TECHNICAL FIELD

The subject matter described herein relates to optimizing queries using a rule-based extendable query optimizer.

BACKGROUND

Query optimization is based on two main areas: query modeling and query execution. Query designers strive for expressive, understandable and semantical models. The paradigm applied is to declaratively describe a desired result. In contrast, query execution is concerned about the most efficient path of execution. Query execution rarely takes into account concerns such as expressiveness, understandability and semantics. Rather, the only rule it must obey is to guarantee the equivalent informational semantics of the query after and before optimization.

A query optimizer must consider a variety of options and dependencies in order to find the optimal execution path. In addition, the query optimizer must recognize non-trivial patterns that originate from complex business semantics. An optimizer must be maintainable and understandable in order to further develop and change in an iterative manner.

SUMMARY

In one aspect, a query is received which causes an initial data flow graph that includes a plurality of nodes that are used to execute the query is generated. Thereafter, the initial data flow graph is optimized using a model optimizer that includes an optimizer framework and an application programming interface (API). The optimizer framework provides logic to restructure the initial data flow graph and a rules engine for executing one or more optimization rules. The API allows for registration of new optimization rules to be executed by the rules engine. Execution of the query is then initiated using the optimized data flow graph.

The optimizer rules can affect only a single node of the initial data graph during optimizing or they can affect multiple nodes. The optimizer framework can assign priorities to at least a portion of the optimization rules that are used to determine when to execute a particular optimization rule. Similarly, the optimizer framework can assign cost functions to at least a portion of the optimization rules that are used to determine when to execute a particular optimization rule.

Each rule can identify a start node in the initial data flow graph from which optimization can be initiated and/or one to N predecessors of the corresponding start node from which optimization can be initiated. Each rule can specify read and write operations to perform on corresponding nodes. The API can provide a list of nodes of the initial data flow graph to be removed by the optimizer framework during optimizing.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the current subject matter provides a query that can easily be modified/extended while, at the same time, provides enhanced usability.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
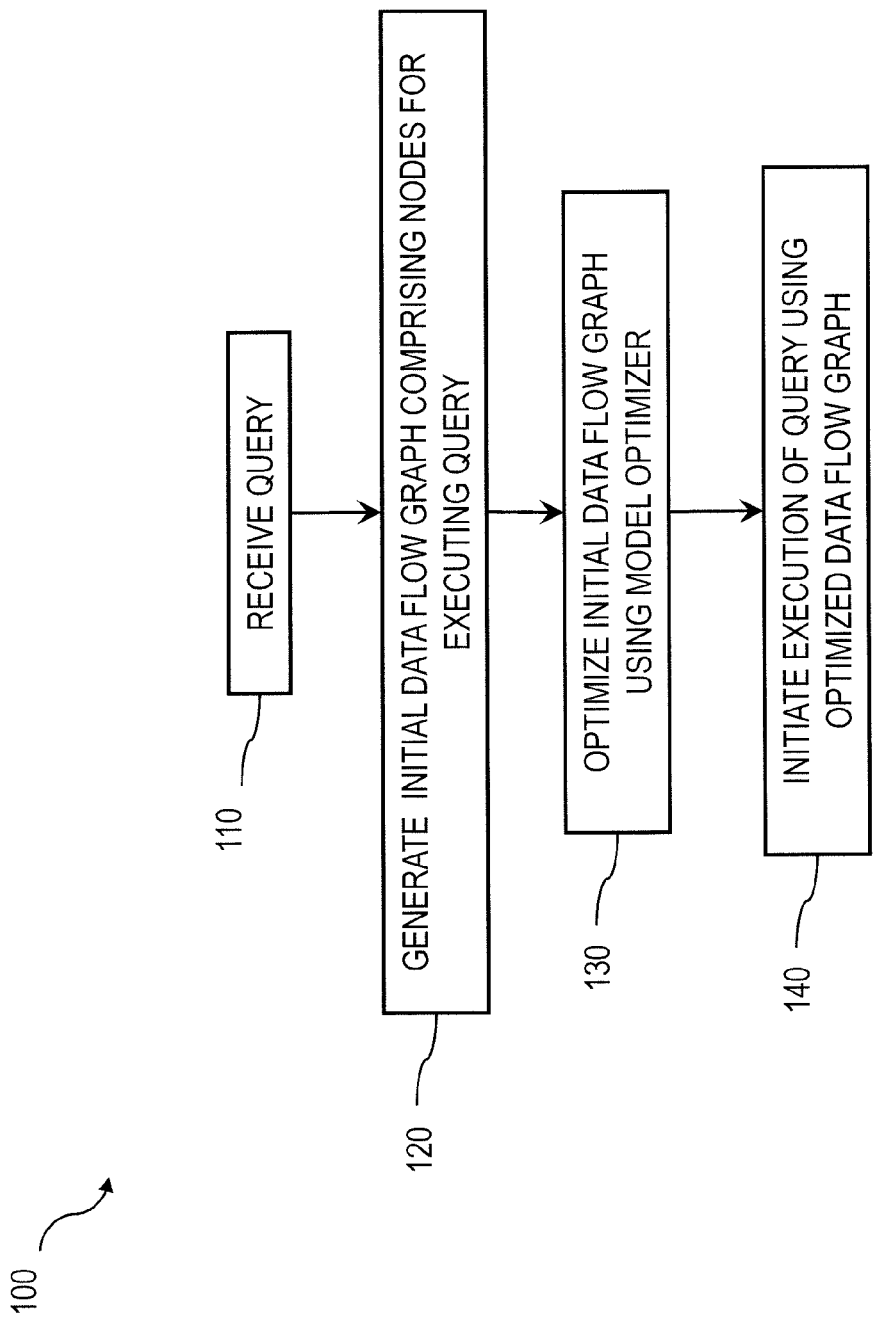
FIG. 1 is a process flow diagram illustrating generation of an optimized data flow graph using a model optimizer.

FIG. 1 is a process flow diagram 100 illustrating a method in which, at 110, a query is received so that, at 120, an initial data flow graph that includes a plurality of nodes for executing the query can be generated. Thereafter, at 130, the initial data flow graph is optimized using a model optimizer. The model optimizer includes an optimizer framework and an application programming interface (API). The optimizer framework provides logic to restructure the initial data flow graph and a rules engine for executing one or more optimization rules. The API allows for registration of new optimization rules to be executed by the rules engine. The optimized data flow graph is used, at 140, to initiate execution of the query.

Figure 2:
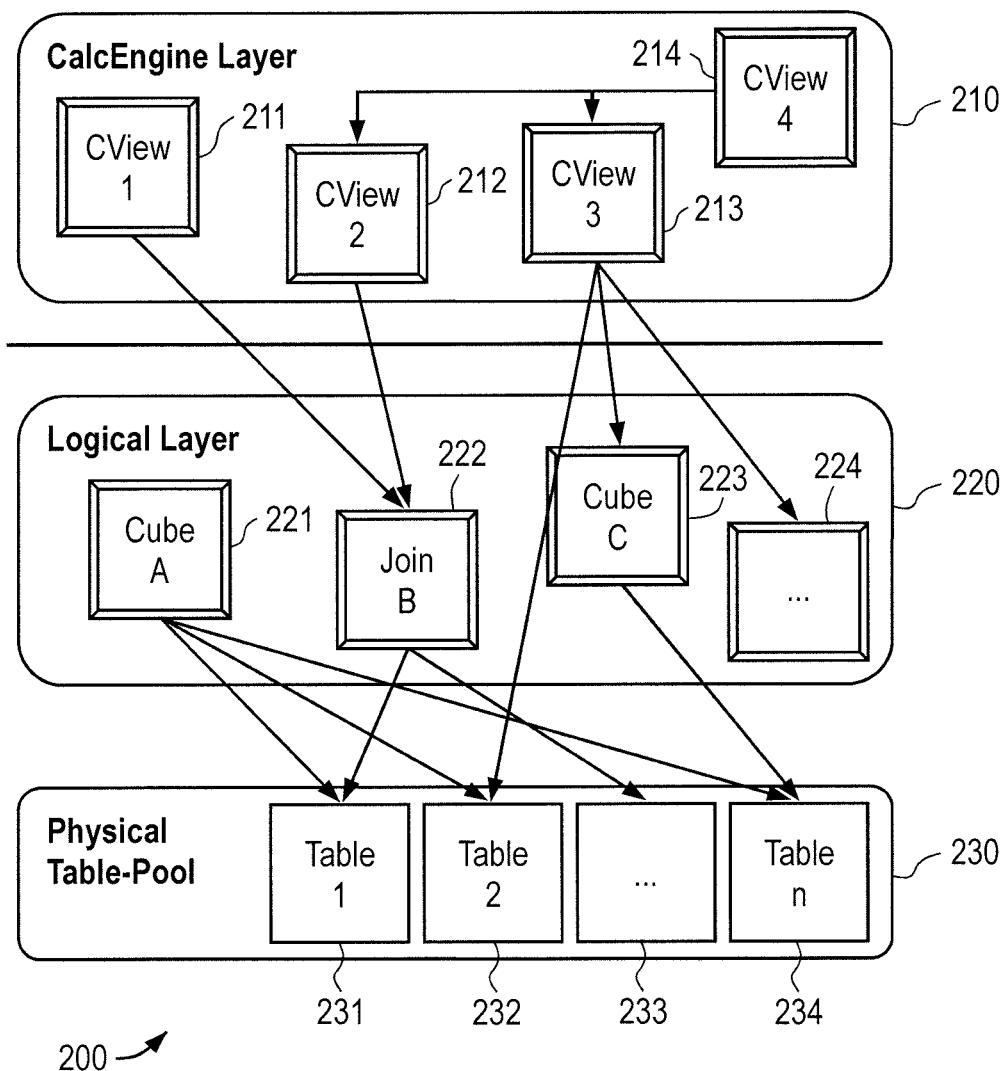
FIG. 2 is a diagram illustrating a calculation engine layer, a logical layer, a physical table pool and their interrelationship.

The current subject matter can be implemented, for example, in connection with a calculation engine environment such as that illustrated in the diagram 200 of FIG. 2. In FIG. 2, illustrated are a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP index) can be assigned roles (e.g., fact or dimension tables) and joined to form a star schema. It is also possible to form join indexes, which can act like database view in environments such as the Fast Search Infrastructure (FSI) by SAP AG.

Calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP indexes or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. Example environments for implementing calculation scenarios can be found, for example, in U.S. patent application Ser. No. 12/914,445, the contents of which are hereby fully incorporated by reference.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Figure 3:
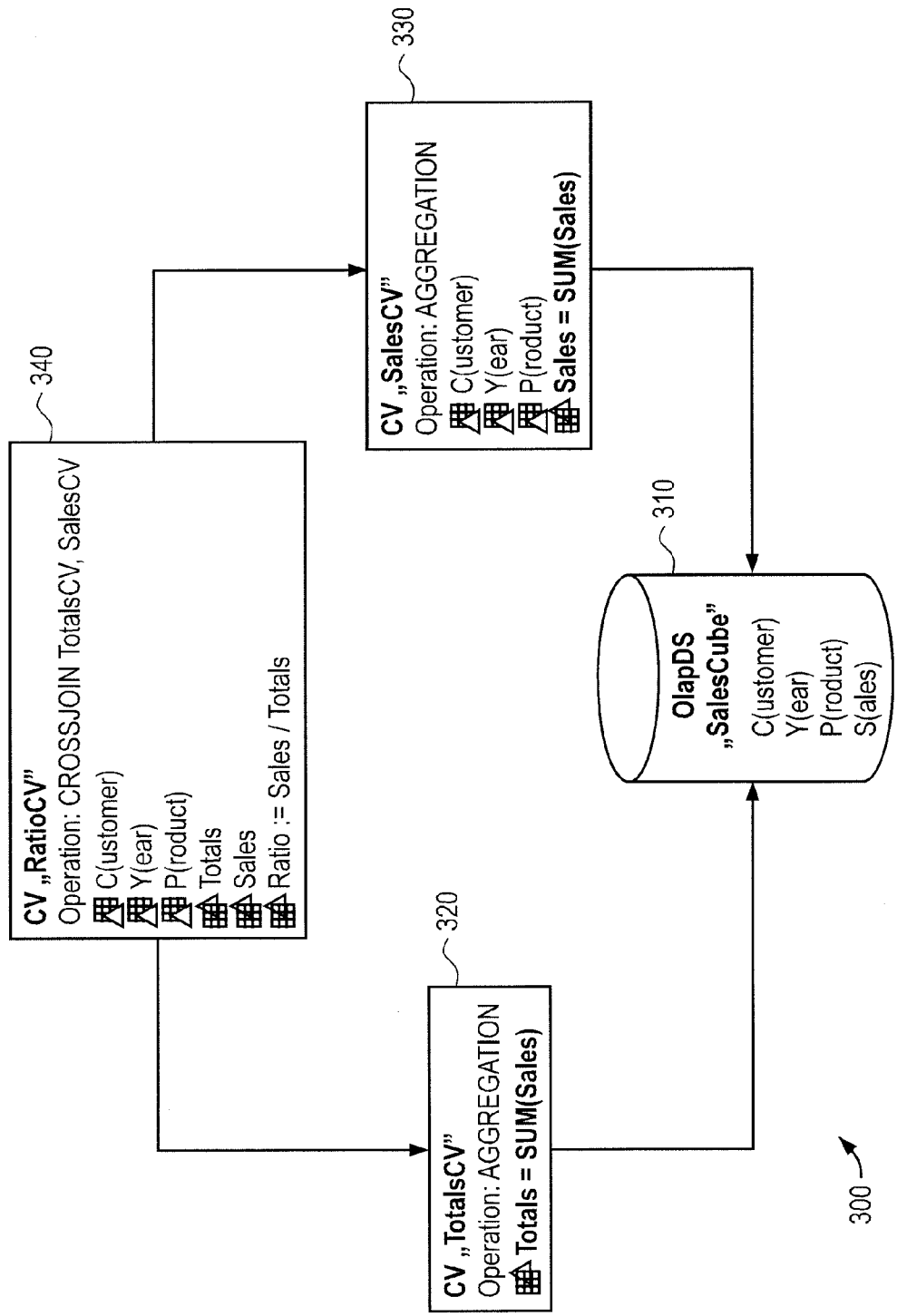
FIG. 3 is a diagram illustrating a first instantiation of a calculation scenario.

FIG. 3 is a diagram 300 illustrating an example of a calculation scenario that relates a number of sales to total sales. With conventional arrangements, such a query can be expressed with several SQL statements but not in a single statement, because for the calculation of the relation two aggregations at different aggregation levels are required. To calculate the number of sales, aggregation is performed by a requested GroupBy attribute. To calculate the sales total, all sales need to be aggregated. Previously this required two separate requests on different SQL view, and the final calculation had to be performed in the application (as opposed to database-side).

For this example, that data source is an OLAP cube "SalesCube" 330, which has the three dimensions Customer, Year, and Product as well as the measure Sales. As stated, this data source 310 can be entered as a special DataSource node in the logical layer 220 in the calculation scenario. The DataSource is now referenced from two calculation nodes. The calculation node TotalsCV 320 on the left side calculates the sales total, by simply summing the sales without any GroupBy attributes. The calculation node SalesCV 330 on the right side calculates the sales according to the GroupBys. To calculate their relationship, the two calculation nodes 320, 330 are joined with each other using a CrossJoin. In the calculation node RatioCV 340 after the join, all the attributes needed for the calculation are available and a new calculated attribute Ratio is provided.

Figure 4:
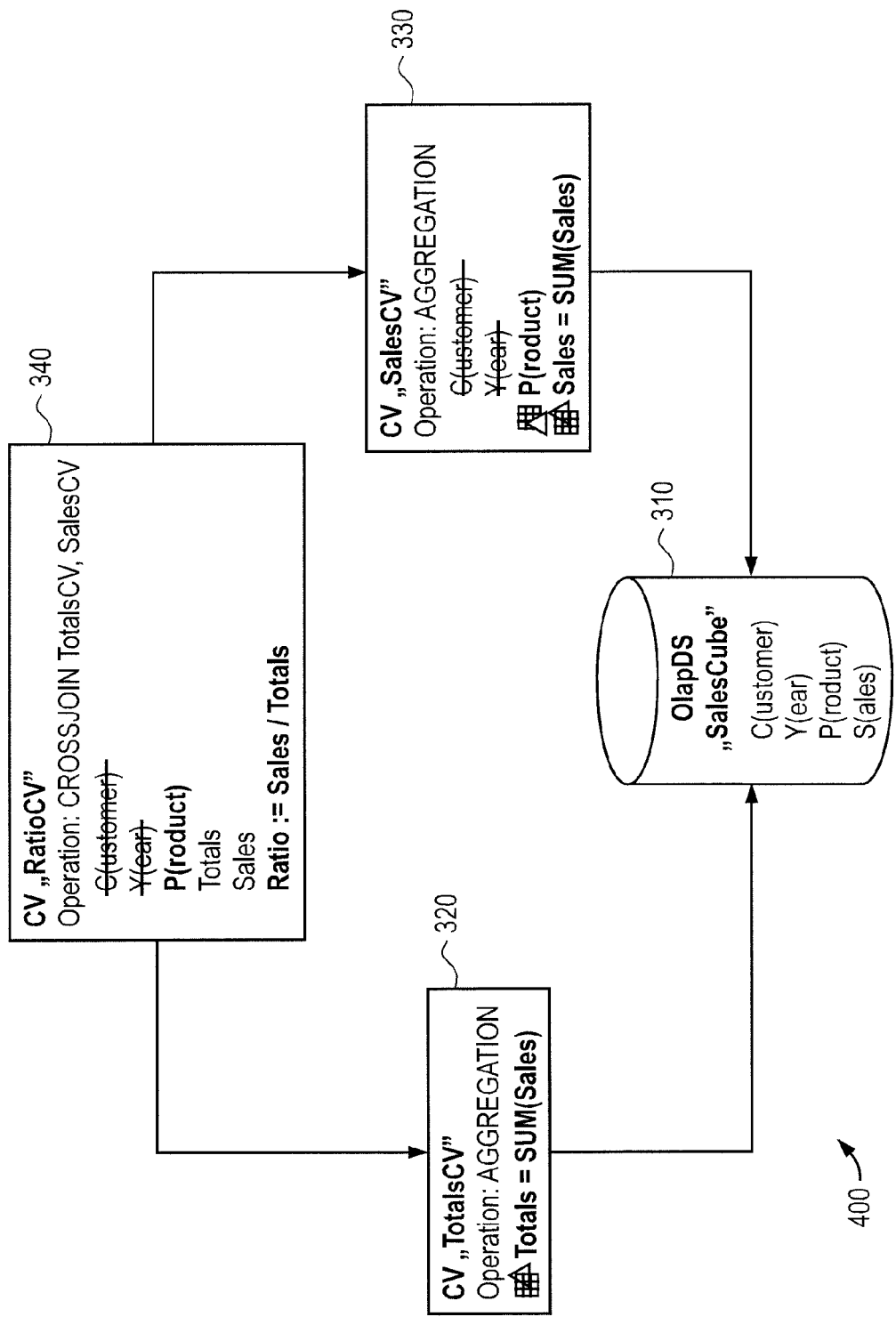
FIG. 4 is a diagram illustrating a second instantiation of a calculation scenario.

The implementation of FIG. 3 is a general calculation scenario. That is, if the calculation scenario is queried via a SQL statement which only requests product as GroupBy attribute, the model is appropriately instantiated and executed. FIG. 4 is a diagram 400 illustrating a variation in which not all of the attributes specified by the calculation nodes 330, 340 are required. In particular, the ratio calculation is for sales relative to total sales without regard to customer and year. In the instantiation, the unnecessary attributes Customer and Year are removed from the calculation nodes RatioCv 340 and SalesCV 330 which accelerates execution of the results (e.g., the ratio) because less data has to be touched (i.e., fewer attributes need to be searched/persisted, etc.).

Figure 5:
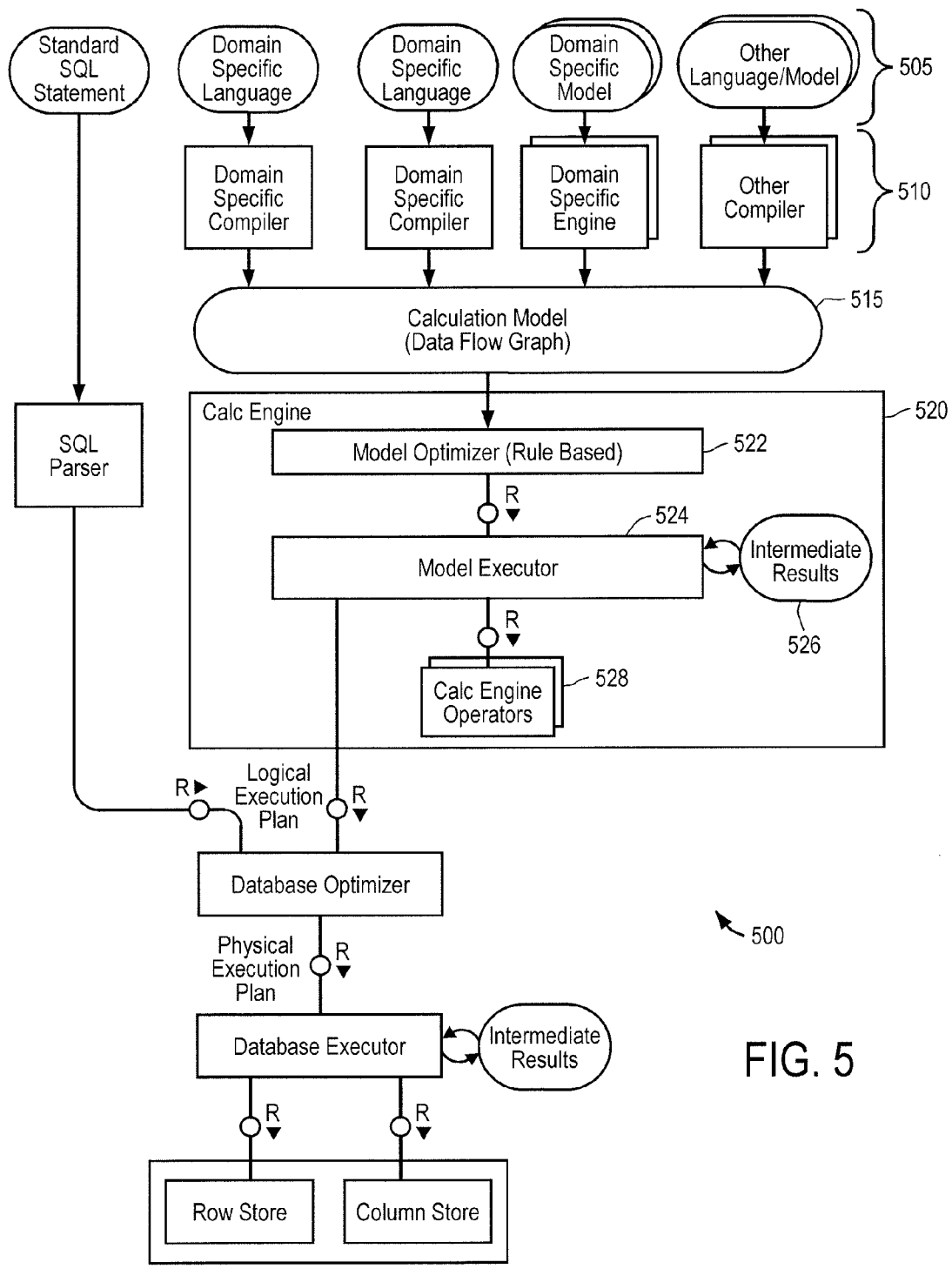
FIG. 5 is a diagram illustrating an architecture for processing and execution control.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (illustrated as a calculation model). To achieve enhanced performance, the models and programs written in these languages are executed inside the database server. This arrangement eliminates the need to transfer large amounts of data between the database server and the client application. Once the different artifacts 505 are compiled into this calculation scenario 515, they can be processed and executed in the same manner. The execution of the calculation scenarios 515 (i.e., data flow graphs) is the task of a calculation engine 520.

The calculation scenario 515 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "ALTER SYSTEM ADD SCENARIO <xml OR j son representing the scenario>". Once a calculation scenario 515 is created, it can be queried (e.g., "SELECT A, B, C FROM <scenario name>", etc.). In some cases, databases can have pre-defined calculation scenarios 515 (default, previously defined by users, etc.). The calculation scenarios 515 can be persisted in a repository (coupled to the database server) or in transient scenarios, the calculation scenarios 515 can be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

Optimization of a calculation scenario (for example by the model optimizer 522), as described herein can include various operations such as removal of operation nodes, combination of operation nodes, and pushing down filters (such as described in co-pending application Ser. No. 13/457,315 filed concurrently herewith, the contents of which are hereby incorporated by reference). The model optimizer 522 can be considered to have two parts. One part of the model optimizer 522 is an optimizer framework that offers common logic to restructure the data flow graph and provides the basic infrastructure for plugin of new rules, order to rules and execute them. The second part of the model optimizer 522 is the rule API. The rules are such that it makes no difference if a rule only considers one node of the data flow graph or multiple nodes.

The model optimizer 522 can be arranged such that it is easily extended with new rules by having a defined API that allows for registration of new rules as plug-ins. These rules can consider 1, 2 or N nodes of the data flow graph depending on the particular optimization. With the current subject matter, a defined API can be implemented by each rule such that a start node is identified from which the optimization can be done. Due to the fact that all nodes in the data flow graph are connected, each rule can only consider the start node or one to N of the start nodes predecessors. A rule can be capable of applying read and write operations on all nodes such as removing a filter on one node, rewriting the filter and append the rewritten filter to another node.

Additionally, the API can provide a list of nodes that should be removed from the data flow graph by the optimizer framework of model optimizer 522. Removal can be needed if two or N nodes are combined (thereby obviating the need to separately consider the nodes as part of the query). The rule itself need only insert the node that should be removed from the graph after the rule is applied. All the reconnecting logic can be provided by the surrounding optimizer framework of the model optimizer 522.

A rule can characterized as a black box for the optimizer framework of the model optimizer 522 which means that the optimizer framework can be considered to be an execution engine for a set of rules. Due to the fact that all rules are implementing the same interface, it can be possible to change the order of rules. Each rule can have an associated cost function which returns the estimated costs (in the sense of optimization gain or benefit) that comes along with the application of the rule. Based on the costs, the model optimizer 522 can reorder the rules to archive the best optimizations.

New rules can be registered to the optimizer framework of the model optimizer 522 and chained automatically into the optimization process. Also, the order of the execution of the rules can be determined automatically based on the costs that each rule reports to the model optimizer 522. This arrangement allows the independent development of multiple rules because there is no interaction between the rules.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figure(s) and described herein do not require the particular order shown, or sequential order, to achieve desirable results. Other embodiments may be within the scope of the following claims.

What is claimed is:

1. A computer implemented method comprising:
receiving, via an application programming interface (API) of a calculation engine including a model optimizer having an optimizer framework, data comprising at least one optimization rule, the calculation engine executing on a calculation engine layer that interacts with a physical table pool and a logical layer, the physical table pool comprising physical tables containing data to be queried, and the logical layer defining a logical metamodel joining at least a portion of the physical tables in the physical table pool;
registering, by the calculation engine, the at least one optimization rule for execution by a rules engine of the optimizer framework, wherein the optimizer framework assigns cost functions to at least a portion of optimization rules, the cost functions being used to determine when to execute a particular optimization rule;
receiving, by the calculation engine, subsequently each query;
generating, by the calculation engine, an initial data flow graph comprising a plurality of nodes specifying operations for executing the query;
optimizing, by the calculation engine, the initial data flow graph using the rules engine, wherein at least one rule is applied to only a single node of the initial data flow graph, wherein a first subset of the operations are executed directly by the calculation engine and a second, different subset of the operations are transformed into a set of logical database execution plans, wherein each rule of the rules engine identifies one to N predecessors of corresponding start node from which optimization can be initiated, wherein N is an integer number, wherein said each rule specifies read and write operations to perform on corresponding nodes; and
initiating executing of the query using the optimized data flow graph.

2. The method as in claim 1, wherein at least one optimizer rule used by the model optimizer affects only a single node of the initial data graph during optimizing.

3. The method as in claim 1, wherein at least one optimizer rule used by the model optimizer affects at least two nodes of the initial data graph during optimizing.

4. The method as in claim 1, wherein the optimizer framework assigns priorities to at least a portion of the optimization rules, the priorities being used to determine when to execute a particular optimization rule.

5. The method as in claim 1, wherein each rule identifies a start node in the initial data flow graph from which optimization can be initiated.

6. The method as in claim 1, wherein the API provides a list of nodes of the initial data flow graph to be removed by the optimizer framework during optimizing.

7. The method as in claim 1, wherein the receiving, generating, optimizing, and initiating are executed by one or more data processors across one or more computing systems.

8. A non-transitory computer-readable medium storing instructions which, when executed by at least one data processor forming part of at least one computing system, result in operations comprising:
receiving, via an application programming interface (API) of a calculation engine including a model optimizer having an optimizer framework, data comprising at least one optimization rule, the calculation engine executing on a calculation engine layer that interacts with a physical table pool and a logical layer, the physical table pool comprising physical tables containing data to be queried, and the logical layer defining a logical metamodel joining at least a portion of the physical tables in the physical table pool;
registering, by the calculation engine, the at least one optimization rule for execution by a rules engine of the optimizer framework, wherein the optimizer framework assigns cost functions to at least a portion of optimization rules, the cost functions being used to determine when to execute a particular optimization rule;
receiving, by the calculation engine, subsequently each query;
generating, by the calculation engine, an initial data flow graph comprising a plurality of nodes specifying operations for executing the query;
optimizing, by the calculation engine, the initial data flow graph using the rules engine, wherein at least one rule is applied to only a single node of the initial data flow graph, wherein a first subset of the operations are executed directly by the calculation engine and a second, different subset of the operations are transformed into a set of logical database execution plans, wherein each rule of the rules engine identifies one to N predecessors of corresponding start node from which optimization can be initiated, N is an integer number, wherein said each rule specifies read and write operations to perform on corresponding nodes; and
initiating executing of the query using the optimized data flow graph.

9. The non-transitory computer-readable medium as in claim 8, wherein at least one optimizer rule used by the model optimizer affects only a single node of the initial data graph during optimizing.

10. The non-transitory computer-readable medium as in claim 8, wherein at least one optimizer rule used by the model optimizer affects at least two nodes of the initial data graph during optimizing.

11. The non-transitory computer-readable medium as in claim 8, wherein the optimizer framework assigns priorities to at least a portion of the optimization rules, the priorities being used to determine when to execute a particular optimization rule.

12. The non-transitory computer-readable medium as in claim 8, wherein each rule identifies a start node in the initial data flow graph from which optimization can be initiated.

13. The non-transitory computer-readable medium as in claim 8, wherein the API provides a list of nodes of the initial data flow graph to be removed by the optimizer framework during optimizing.

14. A system comprising:
    one or more data processors; and
    memory coupled to the at least one data processors storing instructions, which when executed, result in operations comprising:
    receiving, via an application programming interface (API) of a calculation engine including a model optimizer having an optimizer framework, data comprising at least one optimization rule, the calculation engine executing on a calculation engine layer that interacts with a physical table pool and a logical layer, the physical table pool comprising physical tables containing data to be queried, and the logical layer defining a logical metamodel joining at least a portion of the physical tables in the physical table pool;
    registering, by the calculation engine, the at least one optimization rule for execution by a rules engine of the optimizer framework, wherein the optimizer framework assigns cost functions to at least a portion of optimization rules, the cost functions being used to determine when to execute a particular optimization rule;
    receiving, by the calculation engine, subsequently each query, wherein, for said each subsequently received query, an initial data flow graph is generated that comprises a plurality of nodes specifying operations for executing the query, the initial data flow graph is optimized using the model optimizer, and execution of the query is initiated using the optimized data flow graph, the at least one optimization rule only relating to a subset of nodes of the initial data flow graph, wherein a first subset of the operations are executed directly by the calculation engine and a second, different subset of the operations are transformed into a set of logical database execution plans, wherein each rule of the rules engine identifies one to N predecessors of corresponding start node from which optimization can be initiated, N is an integer number, wherein said each rule specifies read and write operations to perform on corresponding nodes.

* * * * *